UNITED STATES PATENT OFFICE.

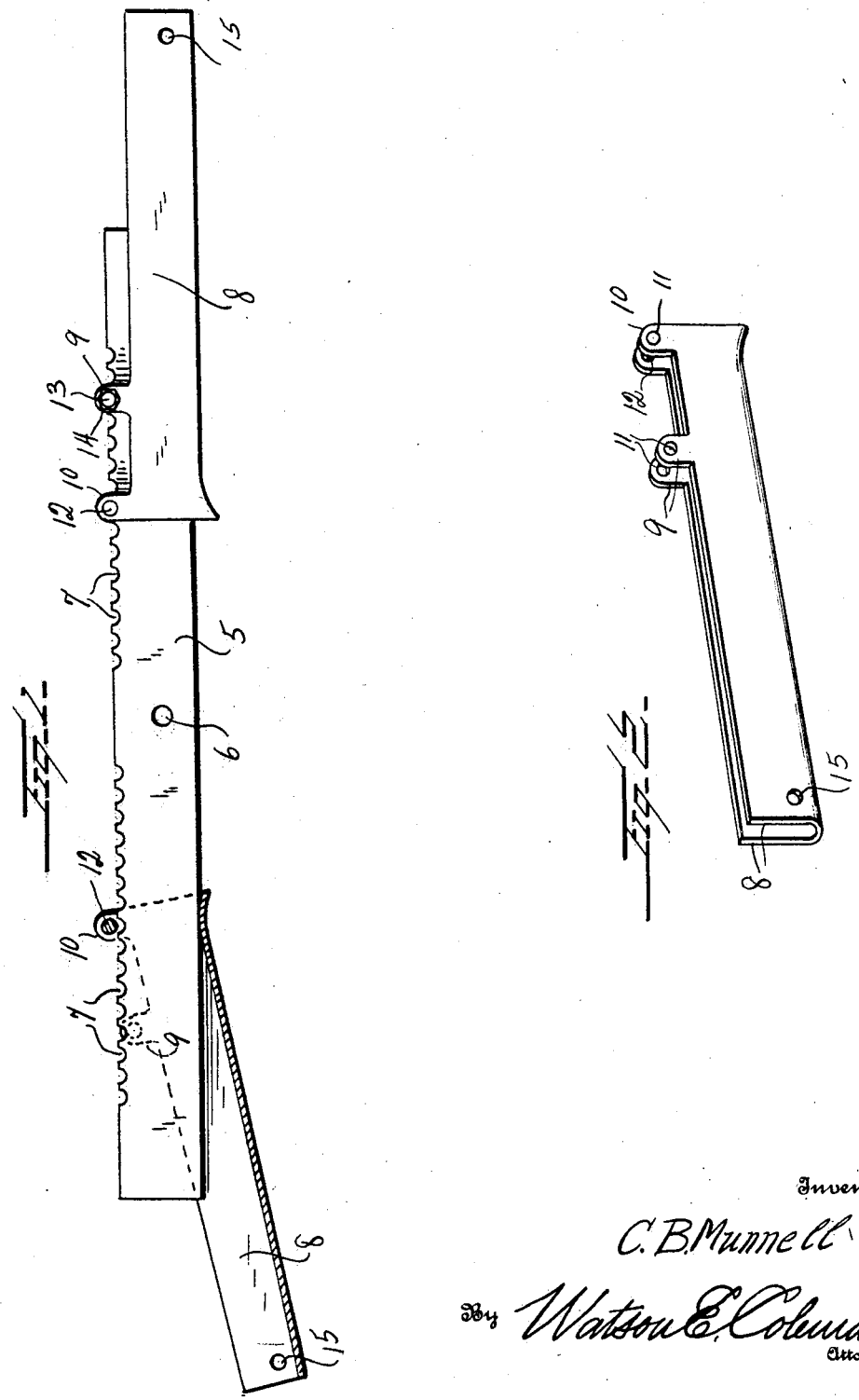

CHARLES B. MUNNELL, OF BROKEN BOW, NEBRASKA.

DOUBLETREE.

1,370,834.   Specification of Letters Patent.   Patented Mar. 8, 1921.

Application filed May 17, 1920. Serial No. 382,163.

*To all whom it may concern:*

Be it known that I, CHARLES B. MUNNELL, a citizen of the United States, residing at Broken Bow, in the county of Custer and State of Nebraska, have invented certain new and useful Improvements in Doubletrees, of which the following is a specification, reference being had to the accompanying drawings.

This invention relates to double trees and particularly to a double tree that can be adjusted.

An object of the invention is to provide a double tree of this character capable of being adjusted to the length desired.

Another object is to provide a double tree which may be adjusted for use in connection with four, five or six horses.

Another object is to provide an adjustable double tree of this character wherein the adjusting members serve to transmit the strain to the central portion of the tree.

A still further object of the invention is to provide an adjustable double tree including a body member or beam on which adjustable arms are mounted, said arms including means for holding them in engagement with the body member, one portion of said means being removable to permit adjustment of the arms.

With these and other objects in view the invention consists in the improved construction and arrangement of parts to be hereinafter more particularly described, fully claimed and illustrated in the accompanying drawing, in which:—

Figure 1 is a plan and sectional view of a double-tree constructed in accordance with an embodiment of the invention, and Fig. 2 is a perspective view of the adjustable arm.

Referring to the drawings, 5 designates the beam or body member of the double tree provided with the usual central openings 6 for pivotally connecting the tree to the vehicle. One longitudinal edge of the body member 5 is provided with the racks 7 which may be formed either in the edge of the beam or be attached to the same.

In order to permit the double tree to be adjusted to the extent desired, a pair of arms are provided, each arm being constructed preferably of sheet metal and bent laterally upon itself to provide sides 8. One end of each arm is flared outwardly, to permit unobstructed adjustment of the arm as shown in Fig. 1. The flared end portion of each of the sides 8 includes ears 9 and 10 which project from the edge of said sides and register with the ears projecting from the opposite side. An opening 11 is formed in each of the arms and registers with a similar opening formed in the adjacent ear on the opposite side of the arms. A pin 12 is extended through the openings 11 of the ears 10. This pin is intended to remain at all times in engagement with the ears 10, but of course can be made removable should repairs be necessary. A pin 13 is passed through the openings 11 of the ears 9. This pin is provided with a nut 14 on one end so as to permit said pin to be readily removed.

When it is desired to adjust the double tree, both of the arms 8 are moved along the body member 5 away or toward each other as the case may be according to the adjustment required. This is possible by moving the pin 13 from engagement with the ears 9 so as to permit the arm to slide by means of the pin through a guide formed by the coöperation of the pin 12 and the arm thereof. It will be noted that the beam is disposed between the sides 8 of the arm. When the desired adjustment has been made, the arm is swung parallel with the body member 5 and the pin 13 inserted in the ears 9 in engagement with the teeth of the rack 7. A double holding mechanism is thereby provided through the coöperation of the pins 12 and 13 with the racks 7 so that the strain is not on any particular pin but is distributed to both. In addition to this the arms and body member are braced as the body member is snugly disposed within the arms. The outer end portion of each arm remote from the ears is provided with an opening 15 through which connecting means is passed in order to connect the double tree to the animals. In view of this, the strain of the load is not transmitted to the end portions of the body member 5 but is transmitted by the arms to the intermediate portion of the body member 5, giving greater strength to the double tree and permitting it to be used under all conditions with entire satisfaction.

When the pin 13 is disposed between the ears 9, the arm is so positioned that the strain is equally distributed to the body member 5, and both pins 12 and 13. This form of double tree, also strengthens the body member 5 by eliminating the necessity of forming an opening adjacent the ends of the body member. The only opening necessary is the opening 6, which of course is disposed in the central portion of the body member. Another feature of this invention is that in case the pin 13 should become damaged, the device can still be used as the end portion of the arm adjacent the ear 10 will be forced against the edge of the body member opposite the edge containing the rack 7 and will be braced through the coöperation of the pin 12, thus permitting the double tree to be used until a pin can be placed in the ears 9.

From the foregoing description, it will be readily seen that this invention provides a novel form of double tree which is very substantial, can be readily adjusted to the length desired without removing the ears from the double tree, and when secured in its adjusted positions, it can be used for all draft purposes and under all conditions without danger of damage to the double tree.

What I claim is:—

1. A device of the character described comprising a body member, rack teeth carried on one of the longitudinal edges of said member, a pair of arms slidably mounted on said body member, each of said arms being U-shaped in cross section, the end portions of said body member being disposed within the U-shaped arms, ears projecting from the side edges of the arms and registering with each other, pins extending through each pair of arms and adapted to engage the adjacent rack teeth, one of said pins being detachable from one pair of said ears to permit unobstructed adjustment of the arms longitudinally of the body member, said detachable pin also preventing slidable movement of the arms through the coöperation of the rack teeth when said pin is engaged with the ears of the arms.

2. A device of the character described comprising a body member, arms partially embracing said body member and arranged for sliding movement obliquely thereof, the portion of said body member not embraced by the arms having rack teeth, and a plurality of spaced pins extending transversely of the arms for engagement with the rack teeth, one of the pins of each arm being removable to permit movement of the arm.

In testimony whereof I hereunto affix my signature.

CHARLES B. MUNNELL.